M. A. NEWMAN.
THREAD CUTTING TOOL.
APPLICATION FILED SEPT. 25, 1916.
1,312,345.
Patented Aug. 5, 1919.
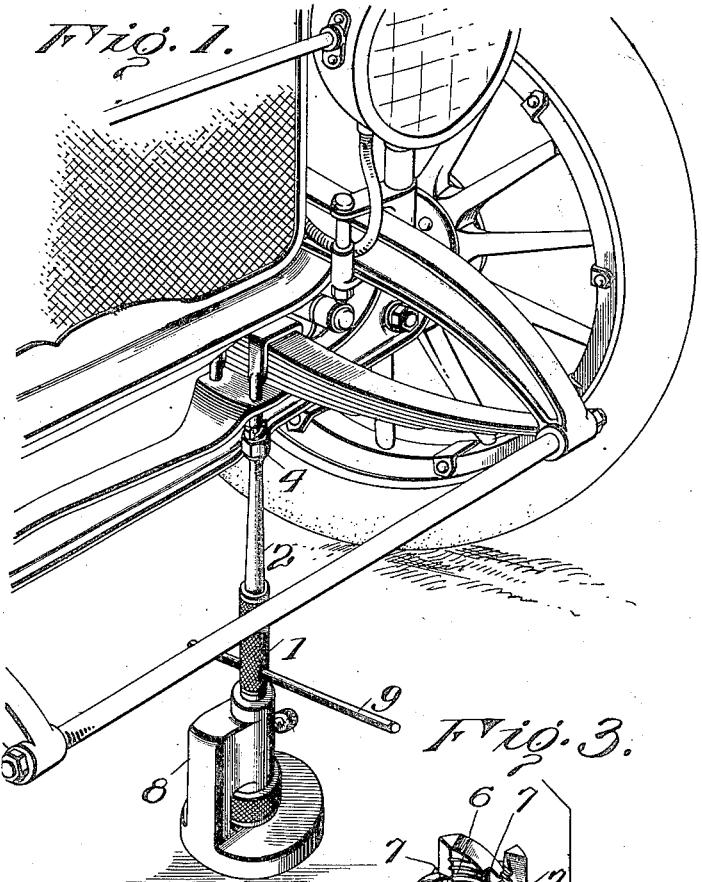
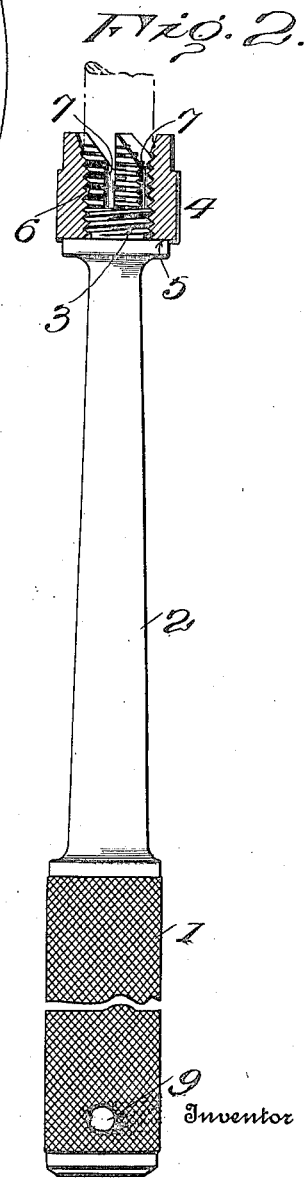
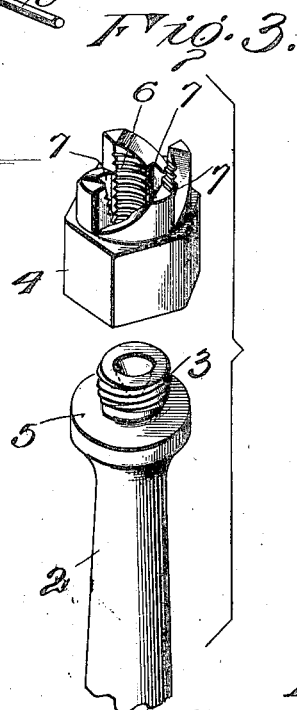
Witness
Inventor
M. A. Newman.
By his Attorneys

UNITED STATES PATENT OFFICE.

MALCOLM A. NEWMAN, OF FLORESVILLE, TEXAS.

THREAD-CUTTING TOOL.

1,312,345.  Specification of Letters Patent.  Patented Aug. 5, 1919.

Application filed September 25, 1916. Serial No. 122,005.

*To all whom it may concern:*

Be it known that I, MALCOLM A. NEWMAN, of Floresville, in the county of Wilson and State of Texas, have invented certain new and useful Improvements in Thread-Cutting Tools; and I do hereby declare the following to be a full, clear, and exact description of the invention, such as will enable others skilled in the art to which it appertains to make and use the same.

My invention relates to thread cutting tools. In repair and other shop work much trouble is frequently caused by damaged threads where it is necessary to force a threaded part through an aperture in a complementary part. This is so pronounced in some instances that the threaded part must be removed and the thread reworked. It is the object of my invention to overcome this difficulty by providing an improved, simple, and highly efficient device which may be effectively used for threading bolts, rods, and other parts after they have been placed in operative position, the device being particularly adapted for supporting a cutting die in accurate working position and also capable of driving the thread cutting die in starting a thread.

In the accompanying drawings, Figure 1 shows the tool in position for threading a U-bolt on an automobile. Fig. 2 is an elevation with parts in section. Fig. 3 shows the parts detached.

The body portion of the tool, as shown in the drawings, comprises a milled handle 1 and a shank 2, the latter at its extreme outer end being screw threaded, as at 3, to receive a cutting die 4. The threads of the shank are of the same pitch as those of the cutting member. The inner face of the latter is designed to bear against a laterally extending shoulder 5 formed on the shank near its outer end and in spaced relation to the threaded end 3. This shoulder in addition to forming a stop for limiting the inward movement of the cutting member on the shank is also designed to effect the initial start of the die on its work when power is applied to turn the handle, as may sometimes be found desirable.

The thread cutting die 4 may be of any preferred form. In the class of work for which this tool is primarily adapted a portion of the cutting die is hexagonal or of other nut shape to permit of the application of a wrench. It is desirable that the cutting member shall have its threads 6 intercepted transversely by the usual ways 7 through which the metal clips may work out.

In the use of the tool, the threading die 6 screwed home on the end of the shank, is positioned for gripping the work to be threaded, the operator readily judging of the accuracy of position by the shank, and the die is turned either by turning the handle, or by means of a wrench. As shown in Fig. 1, for some classes of work an elevating jack 8 is used in connection with the tool for maintaining its verticality. With the device arranged as shown in this figure, the operator with one hand grips the handle 1, or a short rod 9 inserted through an opening in the handle, and with the other hand applies a wrench to the cutting die and by continued movement gradually works the die onto the part to be threaded. This movement also gradually works the die off the screw threaded end of the supporting shank which is of just sufficient length to allow the cutting die to obtain a firm grip on the work to be threaded before the die is disconnected from its guiding support. In some instances the operator may cut the initial threads by simply turning the handle 1, the shoulder 5 on the shank acting to drive the die. By reason of the spaced relation between the threaded end of the shank and the shoulder there is no danger of any binding between the thread cutting die and the shoulder and the handle 1 may readily be detached from the die by reverse movement, the die being thereafter manipulated on the work any required distance by a wrench or other tool.

I claim as my invention:

1. In a screw threading tool, a thread cutting member, a support therefor having one extremity screw threaded for engaging the threads of said cutting member, and means for limiting the extent of engagement between said cutting member and said support.

2. In a screw threading tool, a thread cutting member, a support therefor having one extremity screw threaded for engaging the threads of said cutting member, and means carried by said support for limiting the movement of the latter thereon and coöperating with the cutting member to effect an initial working of the latter when said support is turned axially.

3. In a screw threading tool, a thread cutting member, a support therefor having one extremity screw threaded for engaging the threads of said cutting member, and a shoulder adjacent said screw threaded extremity for limiting the extent of engagement between said cutting member and said support to provide a freeway for the initial engagement of the cutting member with the work.

In testimony whereof, I have signed this specification in the presence of two subscribing witnesses.

MALCOLM A. NEWMAN.

Witnesses.
E. L. WHITSETT,
E. F. WOOLSEY, Jr.